United States Patent [19]

Fitch et al.

[11] Patent Number: 4,475,386
[45] Date of Patent: Oct. 9, 1984

[54] BOREHOLE GRAVIMETRY SYSTEM

[75] Inventors: John L. Fitch, Dallas; W. D. Lyle, Roanoke, both of Tex.

[73] Assignee: Mobil Oil Corporation, New York, N.Y.

[21] Appl. No.: 501,455

[22] Filed: Jun. 6, 1983

[51] Int. Cl.$^3$ ............... E21B 47/06; E21B 49/00
[52] U.S. Cl. .................................. 73/151; 73/152; 166/250
[58] Field of Search .............. 73/151, 152, 382 G, 73/382 R; 166/250

[56] References Cited

U.S. PATENT DOCUMENTS

| | | | |
|---|---|---|---|
| 2,570,659 | 10/1951 | Fay et al. | 73/382 R |
| 3,472,076 | 10/1969 | Howell et al. | 73/382 R |
| 3,998,096 | 12/1976 | Hanciulescu | 73/151 |
| 4,397,181 | 8/1983 | Caldwell | 73/382 R |
| 4,399,693 | 8/1983 | Gournay | 73/152 |

*Primary Examiner*—Howard A. Birmiel
*Attorney, Agent, or Firm*—A. J. McKillop; Michael G. Gilman; George W. Hager

[57] ABSTRACT

A borehole gravimety system employs a pair of pressure transducers for lowering into a borehole along with a borehole gravity meter. The pressure transducers are spaced apart vertically within a pressure sonde for producing a pressure differential measurement of the wellbore fluid. A pressure differential measurement and a gravity reading is taken for each of a plurality of vertical locations within the borehole as the borehole gravimetry system is advanced through the borehole.

9 Claims, 4 Drawing Figures

BOREHOLE GRAVIMETRY SYSTEM

BACKGROUND OF THE INVENTION

Borehole gravimetry has now been developed into a reasonably reliable tool for oil well logging. Borehole gravimetric techniques provide an indication of the bulk density of formation rock surrounding the borehole being logged. Gravimetric logging services now commercially available include that provided by Exploration Data Consultants (EDCON) of Denver, Colo. using a gravity meter of the type developed by LaCoste and Romberg. If accurate measurements of porosity of the formation rock are available, the residual oil saturation can be calculated to a high degree of accuracy.

SUMMARY OF THE INVENTION

The present invention is directed toward a method for conducting a gravimetry survey of subsurface formations surrounding a borehole. In accordance with such method, a borehole is traversed with a logging tool employing a borehole gravity meter and a pair of axially spaced pressure transducers. The traversing of the borehole is periodically stopped to take borehole gravity and wellbore fluid pressure measurements at a plurality of measurement stations within the borehole. The pair of pressure measurements taken at a first of the measurement stations and taken at a second of the measurement stations are used to determine the distance along the borehole between the first and second measurement stations.

In a further aspect of the invention, two pressure measurements are taken by each pressure transducer at each measurement station. More particularly, the traversing of the borehole is stopped at a desired measurement station. A first wellbore fluid pressure measurement is taken by each of the pressure transducers. Upon completion of these first pressure measurements, the borehole gravity measurement is taken by the borehole gravity meter. Upon completion of the borehole gravity measurement, a second wellbore fluid pressure measurement is taken by each of the pressure transducers. Thereafter, the borehole logging tool is advanced through the borehole to the next desired measuring station where gravity and pressure measurements are again taken. This plurality of four pressure measurements taken at successive measurement stations are then used to determine the distance along the borehole between such successive measurement stations.

DESCRIPTION OF THE PREFERRED EMBODIMENT

Figure 1:
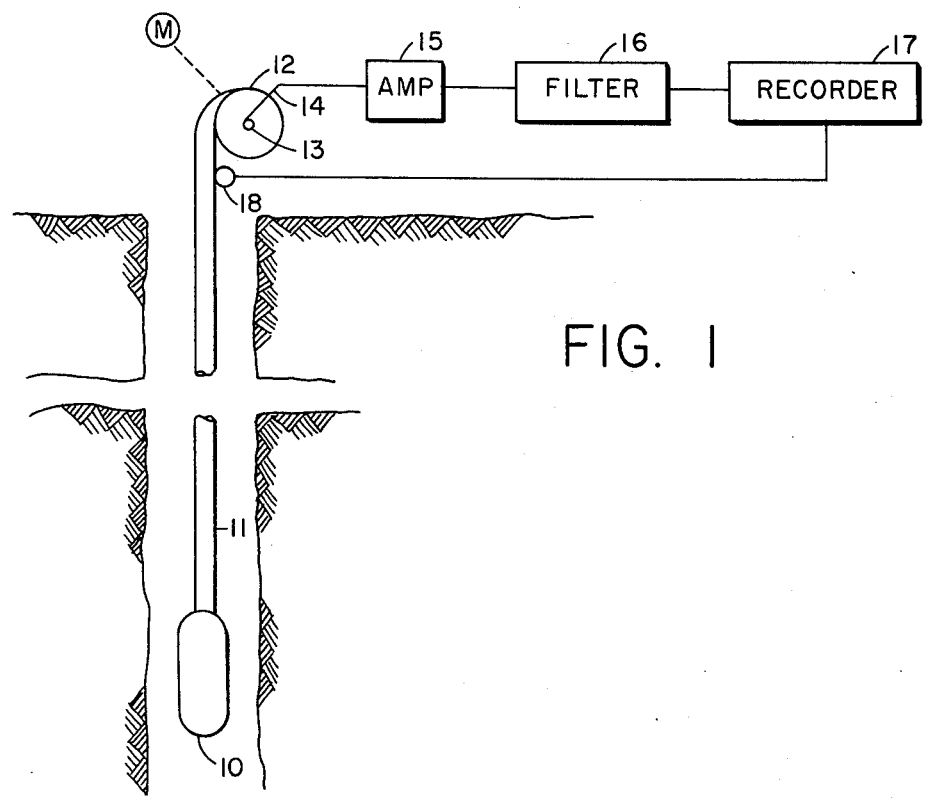
FIG. 1 illustrates a borehole gravimetry system of the prior art.

As mentioned above, borehole gravimetry has now been developed into a reasonably reliable tool for oil well logging. The general arrangement of gravimetric exploration operations is shown in FIG. 1. The LaCoste and Romberg type gravity meter 10 is passed down through a well extending from the surface of the earth through formations of various types until the area of interest is reached. The gravity meter 10 is lowered by means of a cable 11 running over a sheave 12, to the depth of interest. Gravimetric measurements, yielding signals proportional to the density of the surrounding formation, are then made and conducted by way of slip rings 13 and brushes 14 to an amplifier 15, a filter 16, and a recorder 17 to produce a log of gravity measurements as a function of depth. This is a log of true gravity over the depth interval of interest, such depth interval being measured by the reel 18 rotatably coupled to the cable 11.

Figure 2:
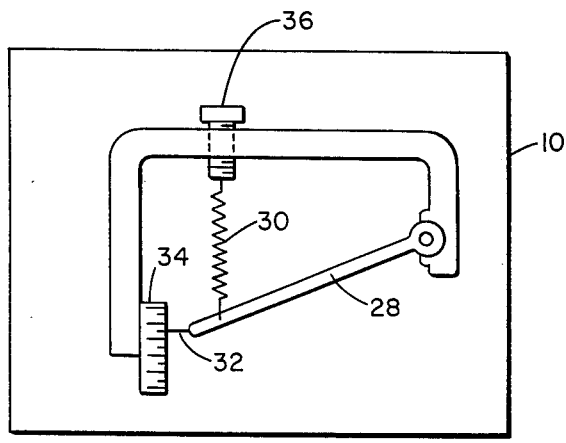
FIG. 2 illustrates a borehole gravity meter suitable for use in carrying out borehole gravity surveys.

FIG. 2 shows a schematic depiction of the LaCoste and Romberg gravity meter; other types of gravity meters are within the scope of the present invention. A lever 28 is pivoted more or less against the bias of a spring 30 in accordance with the vertical component of the earth's gravity in its immediate locale. This meter is capable of yielding results proportional to the density of the formation within a radius of about 100 feet of the borehole itself. A pointer 32 is affixed to the end of the pivoted lever 28 and indicates a point on a scale 34. The spring 30 is connected to a pre-load screw 36 which is moved in order to cause the lever pointer 32 to reach a predetermined index point on the scale 34. The amount of adjustment of the preload required to index the pointer 32 is proportional to local variations in gravity; thus the preload adjustment is effectively the data output by the gravity meter 10. The meter is sealed within an enclosed container before being passed down the hole.

The borehole gravity meter, as the name implies, simply measures the vertical component of the earth's gravitational acceleration at a desired depth in the borehole. Given measurements at two different depths, one obtains the gravitational gradient and can proceed to compute the formation bulk density $\rho_b$ from the following equation:

$$\rho_b = \frac{F - (\Delta g/\Delta Z)}{4\pi G} \quad (1)$$

where

F is the free air gradient;

$\Delta g$ is the gravity difference between the two readings;

$\Delta Z$ is the vertical distance between gravity measurement stations; and

G is the universal gravitational constant.

Written in units of microgals (one gal$-1$ cm/sec$^2$) for $\Delta g$, gm/cc for $\rho_b$, and feet for $\Delta Z$, we have $$\rho_b = 3.687 - 0.039185 \Delta g/\Delta Z. \quad (2)$$

The bulk density $\rho_b$ is representative of the horizontal slab of material that lies within $\Delta Z$; it is the accurate determination of $\rho_b$ by gravimetric techniques which makes a reliable residual oil determination feasible.

As noted above, the gravity meter of FIG. 2 is of conventional design, its details forming no part of the present invention. Similarly, the operations shown schematically in FIG. 1 are presently commercially available from logging contractors and similarly form no part of the present invention. Instead, the present invention relates to a depth referencing system for more accurately determining the vertical distance, $\Delta Z$, between the gravity measurement stations. The accuracy of the determination of bulk density is very sensitive to the accuracy with which the vertical distance between measurement stations can be measured. Fairly accurate measurements of vertical distance can be made from land-based or fixed-platform offshore well locations, if the wells from such locations are vertical. In the case of non-vertical or deviated wells, sufficiently accurate measurements of vertical distance may not be possible. Further, in the case of wells drilled from floating drilling vessels, sufficiently accurate measurements of vertical distance are generally impossible, due to uncontrollable vertical motions of such drilling vessels. Although undesirable motions of the borehole gravity sonde due to such vessel motions may be prevented by clamping the sonde to the borehole wall, accurate measurement of the vertical location of the sonde is still a problem. The depth referencing system of the present invention is directed toward measuring vertical distance accurately under all such operating conditions.

Figure 3:
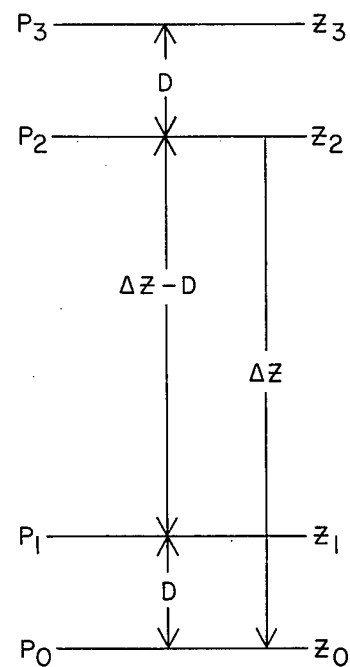
FIG. 3 illustrates the borehole gravimetry system for carrying out the borehole gravity survey of the present invention.
Figure 4:
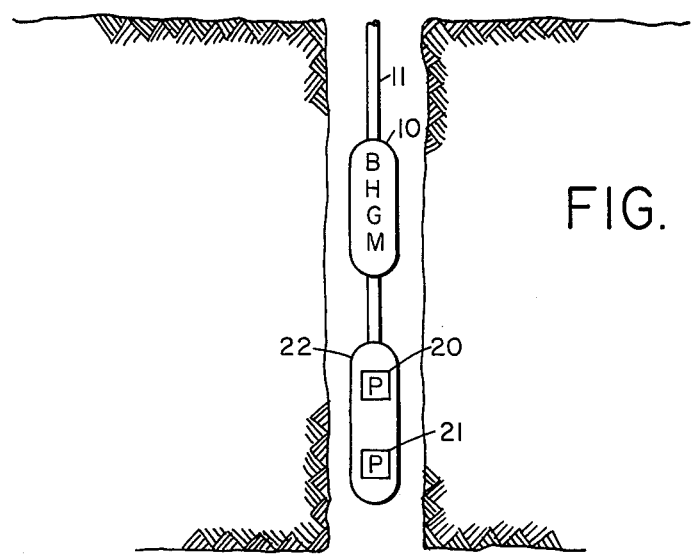
FIG. 4 is a diagrammatic representation of the borehole gravity survey to be carried out by the borehole gravimetry system of FIG. 3.

The depth referencing system is shown in FIG. 3 and employs a pair of transducers 20 and 21 housed in a pressure sonde 22 and lowered into the borehole by cable 11 along with the borehole gravity meter 10. The pressure sonde may be located either above or below the borehole gravity meter. When the borehole gravity meter moves a distance Z, the pressure sonde would also move the same distance. FIG. 4 illustrates diagrammatically the pair of pressure transducers, separated by the distance D and located at the vertical positions $Z_0$ and $Z_1$ within the borehole. At these two vertical positions wellbore fluid pressure measurements, $P_0$ and $P_1$, are made along with the borehole gravity measurement and transmitted to the surface. Next the borehole gravity meter and the pressure sonde are moved upward through the borehole the distance $\Delta Z$ and stopped at a point where the pair of pressure transducers are located at the vertical positions $Z_2$ and $Z_3$. Wellbore fluid pressure readings $P_2$ and $P_3$ are now taken and transmitted to the surface along with the borehole gravity measurement for this location in the borehole. The foregoing is repeated for as many depth locations as desired within the borehole.

These wellbore fluid pressure measurements are utilized to accurately determine the vertical distance $\Delta Z$ between two gravity measurement stations. The pressure difference $\Delta P$ between two points in a fluid-filled borehole separated by a vertical distance $\Delta Z$ is given by the following:

$$\Delta P = \rho_f g \Delta Z \qquad (3)$$

where
$\rho_f$ is the fluid density, and
g is the gravitational acceleration.
Thus, the vertical distance $\Delta Z$ can be represented as follows:

$$\Delta Z = \frac{\Delta P}{\rho_f g} \qquad (4)$$

By the use of a highly sensitive pressure gauge, such as a quartz crystal device, sufficiently accurate measurement of $\Delta P$ can be made when the fluid density is known. By means of two such sensitive pressure gauges an accurate determination of the fluid density can be made. In a preferred embodiment, a pair of Hewlett Packard HP-2813 pressure gauges are mounted in the pressure sonde with vertical separation of about two feet and are clamped to the borehole wall by means of a downhole clamp R 1462 supplied by Geosystems Div. Geosource, Inc., Fort Worth, Tex., during borehole fluid pressure measurements. Various other means have been used in the past to clamp borehole tools to the borehole wall such as the bow spring clamp of U.S. Pat. No. 4,180,727; the spring biased clamp of U.S. Pat. No. 3,340,953; and the hydraulic clamping means of U.S. Pat. No. 3,978,939.

Calculation of vertical distance $\Delta Z$ from the four pressure readings $P_0$, $P_1$, $P_2$ and $P_3$ as shown in FIG. 4 will now be described.

For a static fluid column, the pressure as a function of distance Z satisfies the differential equation $$\frac{dP}{dZ} = -\rho g. \qquad (5)$$

Over the relatively short distance between the measuring stations in borehole gravity logging it can generally be assumed that $\rho$ varies linearly with Z.

Linearity of $\rho$ with Z implies that $$\rho = \rho_0 + m(Z - Z_0) \qquad (6)$$

where $$m = \frac{\rho_3 - \rho_0}{Z_3 - Z_0} \qquad (7)$$

A more convenient form of Eq. (6) is obtained by writing $$\rho = \rho_0 + m_1 Z \qquad (8)$$

with $$m_1 = \frac{\rho_3 - \rho_0}{Z_3} = \frac{\rho_1 - \rho_0}{D} = \frac{\rho_3 - \rho_2}{D} \qquad (9)$$

and Z now represents the distance above $Z_0$.

Inserting Eq. (8) into Eq. (5) and integrating yields $$P = -g\rho_0 Z - gm_1 \frac{Z^2}{2} + C. \qquad (10)$$

where C is a constant of integration. For the lowermost point $Z_0$, P equals $P_0$ so that $$P = P_0 - g\rho_0 Z - gm_1 \frac{Z^2}{2} \qquad (11)$$

Using Eq. (11), a set of equations can be developed for $P_1$ and $P_0$.

$$P_1 = P_0 - g\rho_0 D - g\left(\frac{\rho_1 - \rho_0}{D}\right)\frac{D^2}{2} \qquad (12)$$

$$= P_0 - D\left(\frac{g\rho_0 + g\rho_1}{2}\right) \triangleq P_0 - Dg\bar{\rho}_{01}$$

Likewise, $$P_2 = P_1 - \Delta Z \left( \frac{g\rho_1 + g\rho_2}{2} \right) \triangleq P_1 - \Delta Z g\bar{\rho}_{12} \quad (13)$$

and $$P_3 = P_2 - D \left( \frac{g\rho_2 + g\rho_3}{2} \right) \triangleq P_2 - D g\bar{\rho}_{23} \quad (14)$$

Thus, the pressure difference between points equals the product of average density between the points and the negative of the distance between the points.

From Eq. (8), it can be seen that $$g\bar{\rho}_{12} = \frac{g\rho_1 + g\rho_2}{2} = \frac{1}{2} \left( \frac{g\rho_0 + g\rho_1}{2} + \frac{g\rho_2 + g\rho_3}{2} \right) \quad (15)$$

$$= \frac{1}{2} g\bar{\rho}_{01} + \frac{1}{2} g\bar{\rho}_{23}$$

or in terms of pressures, $$g\bar{\rho}_{12} = \frac{g\bar{\rho}_{01} + g\bar{\rho}_{23}}{2} = \frac{1}{2} \left( \frac{P_0 - P_1}{D} + \frac{P_2 - P_3}{D} \right) \quad (16)$$

From Eqs. (13) and (16), it follows that $$\Delta Z = D \div \frac{(P_1 - P_2)(2D)}{P_0 - P_1 + P_2 - P_3} = \frac{P_1 - P_2}{g\bar{\rho}_{12}} + D \quad (17)$$

In some cases, the true pressure values are not the ones recorded by the pressure transducers due to errors $\theta_i$. Instead, at each measurement location, a value $M_i$ related to the true value $P_i$ is recorded wherein:

$$M_i = P_i + \theta_i \quad (18).$$

A reasonable assumption is that the errors $\theta_i$ are randomly distributed with zero mean, have a common variance and are independent from one measurement to the next. To reduce any such error in the pressure measurements a plurality of pressure measurements may be made by each pressure transducer at a given vertical location in the borehole. In a preferred mode of operation, two sets of pressures are measured at each such location. The first set is taken from the pair of pressure transducers before the borehole gravity measurements are made, and the second set is taken from the pair of pressure transducers following the borehole gravity measurements and before the pressure sonde and borehole gravity meter are advanced through the borehole to the next measurement location. Consequently four pressure readings are taken for each borehole gravity measurement. Thus, when it is believed that there are significant departures of the actual pressure readings $M_i$ from the true values $P_i$ and additional accuracy in the determination of $\Delta Z$ is required over that attainable through the solution of Eq. (17) above, the plurality of pressure readings are taken and processed as being from zero to three, j being from one to two, and the $M_{ij}$ rotation being the j th pressure reading at vertical position i. These pluralities of pressure readings can be used to rewrite Eq. (17) for the vertical distance Z as follows:

$$\Delta Z = \frac{(M_{12} - M_{22})(2D)}{M_{01} - M_{11} + M_{21} - M_{31}} + D \quad (19)$$

In a somewhat more detailed approach, Eq. (19) is expanded to yield a further estimate for the vertical distance Z as follows:

$$\Delta Z = \quad (20)$$

$$\frac{D(3M_{12} + M_{11} - 4M_{22} + M_{02} - M_{01})}{(M_{01} + M_{02} - M_{11} - M_{12} + M_{21} + M_{22} - M_{31} - M_{32})} + D$$

The derivation of Eq. (20) is contained in the following Appendix with $\Delta Z$ being identified in such Appendix as $\hat{Z}_3$.

APPENDIX
$\hat{Z}_3$ Calculations

Determination of $\hat{Z}_3$ and its associated variance requires the introintroduction of some new notation. To this end, define the state vector $X_i$ to be $$X_i = \begin{bmatrix} P_i \\ \Delta Z_i \\ g\bar{\rho}_{i(i+1)} \end{bmatrix} \quad (A.1)$$

Let the pressure measurements be written as $$M_{ij} = I_1 X_i + \theta_{ij} \quad (A.2)$$

where $$I_1 = (1, 0, 0) \quad (A.3).$$

The idea is to use knowledge of the state equation to estimate the state $X_i$ given an estimate of the state $X_{i-1}$. This estimate $X_i$ is then refined by processing the measurement $M_{i2}$ to yield a better estimate of $X_i$. Let $X_i^-$ be the estimate based on an estimate of $X_{i-1}$ and let $X_i^+$ be the refined estimate obtained from $X_i^-$ and $M_{i2}$. Further define state estimate errors $\tilde{X}_i^-$ and $\tilde{X}_i^+$ by $$\tilde{X}_i^+ = X_i^+ - X_i \quad (A.4)$$

$$\tilde{X}_i^- = X_i^- - X_i \quad (A.5)$$

Next, restricting attention to linear estimation, it is desired to determine a $K_i$ and $H_i$ such that $$X_i^+ = K_i X_i^- + H_i M_{i2} \quad (A.6).$$

With the errors associated with $X_i^+$ smaller in a mean-square sense than $X_i^-$. This problem is precisely that for which optimal linear filtering equations provide the solution. The choice of $K_i$ and $H_i$ are derived in any number of texts and are presented here without proof below.

$$K_i = I - H_i I_1, \quad (A.7)$$

where I is the identity matrix, and $$H_i = P_i(-) I_1^T [I_1 P_i(-) I_1^T + \lambda_p^2]^{-1} \quad (A.8)$$

where $I_1^T$ denotes transpose if $I_1$, and $P_i(-)$ is defined by $$P_i(-)=E[(X_i^- - X_i)(X_i^- - X_i)^T]=E[\tilde{X}_i^- \tilde{X}_i^- {}^T]. \quad (A.9)$$

To start the process, we estimate $X_1$ where $$X_i^- = \begin{bmatrix} M_{02} - (g\rho_{01})^- D \\ D \\ (g\rho_{01})^- \end{bmatrix} \quad (A.10)$$

where $g\bar{\rho}_{01}$ is obtained by using the first set of pressure measurements at depths $Z_0$ and $Z_1$. Thus, $$(g\rho_{01})^- = \frac{M_{01} - M_{11}}{D} \quad (A.11)$$

with $$E[(g\rho_{01})^- - g\bar{\rho}_{01}]^2 = \frac{2\lambda_p^2}{D^2} \quad (A.12)$$

Then $$\tilde{X}_1^- = \begin{bmatrix} M_{02} - (g\rho_{01})^- D - P_1 \\ 0 \\ (g\rho_{01})^- - g\bar{\rho}_{01} \end{bmatrix} = \begin{bmatrix} M_{02} - P_0 - (g\rho_{01})^- D + g\bar{\rho}_{01} D \\ 0 \\ (g\rho_{01})^- - g\bar{\rho}_{01} \end{bmatrix}$$

$$= \begin{bmatrix} \theta_{02} - (\theta_{11} - \theta_{01}) \\ 0 \\ \frac{\theta_{01} - \theta_{11}}{D} \end{bmatrix}. \quad (A.13)$$

From which $P_i(-)$ is calculated to be $$P_1(-) = \begin{bmatrix} 3\lambda_p^2 & 0 & -\frac{2\lambda_p^2}{D} \\ 0 & 0 & 0 \\ -\frac{2\lambda_p^2}{D} & 0 & \frac{2\lambda_p^2}{D^2} \end{bmatrix}. \quad (A.14)$$

Thus, $$H_1 = P_1(-)\begin{pmatrix} 1 \\ 0 \\ 0 \end{pmatrix}\left[(1,0,0)P_1(-)\begin{pmatrix} 1 \\ 0 \\ 0 \end{pmatrix} + \lambda_p^2\right]^{-1} \quad (A.15)$$

$$= \begin{pmatrix} 3\lambda_p^2 \\ 0 \\ -\frac{2\lambda_p^2}{D} \end{pmatrix} \frac{1}{4\lambda_p^2} = \begin{pmatrix} \frac{3}{4} \\ 0 \\ -\frac{1}{2D} \end{pmatrix}$$

Using Eqs. (A.6) and (A.7), we have $$X_i^+ = X_i^- + H_i[M_{12} - X_i^-] \quad (A.16)$$

so that $$X_i^+ = \quad (A.17)$$

$$\begin{bmatrix} M_{02} - (g\rho_{01})^- D \\ D \\ (g\rho_{01})^- \end{bmatrix} + \begin{pmatrix} \frac{3}{4} \\ 0 \\ -\frac{1}{2D} \end{pmatrix} [M_{12} - M_{02} + (g\rho_{01})^- D]$$

or $$\begin{bmatrix} P_1^+ \\ D \\ (g\rho_{01})^+ \end{bmatrix} = \begin{bmatrix} \frac{3M_{12} + M_{02} + M_{11} - M_{01}}{4} \\ D \\ \frac{M_{10} - M_{11} + M_{02} - M_{12}}{2D} \end{bmatrix} \quad (A.18)$$

The state equation for the next part of the calculations is $$P_2 = P_1 - g\bar{\rho}_{12}(\tilde{Z} - D), \quad (A.19)$$

so $P_2^-$ is taken to be $$P_2^- = P_1^+ - (Z-D)[\tfrac{1}{2}(g\rho_{01})^+ + \tfrac{1}{2}(g\rho_{23})^-] \quad (A.20)$$

where $(g\rho_{01})^+$ is obtained from Eq. (A.18) and $(g\rho_{23})^-$ is estimated to be $$(g\rho_{23})^- = \frac{(M_{21} + M_{22}) - (M_{31} + M_{32})}{2D} \quad (A.21)$$

and $Z$ is an estimate of $Z$ obtained from the wireline odometer in the case of floating rigs, and from the odometer and an estimate of the deviation in deviated wells. The estimate $Z$ is assumed to satisfy $$Z = \tilde{Z} + \omega \quad (A.22)$$

$$E(\omega) = 0 \quad (A.23)$$

$$E(\omega^2) = \sigma^2, \quad (A.24)$$

and $\sigma^2$ is typically on the order of one foot.

The state estimate $X_2^-$ is given by $$X_2^- = \begin{bmatrix} P_2^- \\ Z-D \\ (g\rho_{12})^- \end{bmatrix} = \begin{bmatrix} P_1^+ - (g\rho_{12})^-(Z-D) \\ Z-D \\ (g\rho_{12})^- \end{bmatrix} \quad (A.25)$$

where from Eq. (A.20) $(g\rho_{12})^-$ is seen to be $$(g\rho_{12})^- = \frac{P_0 - P_1}{2D} + \frac{P_2 - P_3}{2D} + \quad (A.26)$$

$$\frac{(\theta_{01} + \theta_{02} - \theta_{11} - \theta_{12} + \theta_{22} - \theta_{31} - \theta_{32})}{4D}$$

$$= \tfrac{1}{2} g\bar{\rho}_{01} + \tfrac{1}{2} g\bar{\rho}_{23} + \epsilon_{12}$$

$$= g\bar{\rho}_{12} + \epsilon_{12}$$

which follows using Eq. (15). In Eq. (A.26), $\epsilon_{12}$ as implicitly defined has the properties $$E(\epsilon_{12}) = 0$$

and $$E(\epsilon_{12}^2) = \frac{\lambda_p^2}{2D^2}. \quad (A.27)$$

Using Eqs. (A.26) and (A.22), the error matrix becomes $$\tilde{X}_2^- = \begin{bmatrix} P_1^+ - (g\rho_{12})^-(Z-D) - P_2 \\ Z - \bar{Z} \\ (g\rho_{12})^- - g\bar{\rho}_{12} \end{bmatrix} = \quad (A.28)$$

$$\begin{bmatrix} P_1^+ - P_1 - (g\rho_{12})^-(Z-D) + g\bar{\rho}_{12}(\bar{Z}-D) \\ Z - \bar{Z} \\ (g\rho_{12})^- - g\bar{\rho}_{12} \end{bmatrix}$$

$$= \begin{bmatrix} \frac{3\theta_{12} + \theta_{02} + \theta_{11} - \theta_{01}}{4} - (g\bar{\rho}_{12}+\epsilon_{12})(\bar{Z}-D+\omega)+g\bar{\rho}_{12}(\bar{Z}-D) \\ \omega \\ \epsilon_{12} \end{bmatrix}$$

$$= \begin{bmatrix} \frac{3\theta_{12} + \theta_{02} + \theta_{11} - \theta_{02}}{4} - \epsilon_{12}(\bar{Z}-D) - \omega g\bar{\rho}_{12} + \epsilon_{12}\omega \\ \omega \\ \epsilon_{12} \end{bmatrix}$$

From Eq. (A.8) it can be seen that only the first column of $P_2(-)$ is needed. Consequently, carrying out the operations required to determine the first column entries results in $$P_2(-) = \quad (A.29)$$

$$\begin{bmatrix} \frac{3}{4}\lambda_p^2 + (\bar{Z}-D)^2 E(\epsilon_{12}^2) + \sigma^2(g\bar{\rho}_{12})^2 + \sigma^2 E(\epsilon_{12}^2) + \frac{(\bar{Z}-D)\lambda_p^2}{4D} \\ -\sigma^2(g\bar{\rho}_{12}) \\ -\frac{(\bar{Z}-D)\lambda_p^2}{2D^2} - \frac{\lambda_p^2}{4D} \end{bmatrix}$$

$$= \begin{bmatrix} \frac{3}{4}\lambda_p^2 + (\bar{Z}-D)^2 \frac{\lambda_p^2}{2D^2} + \sigma^2(g\bar{\rho}_{12})^2 + \frac{\sigma^2\lambda_p^2}{2D^2} + \frac{(\bar{Z}-D)\lambda_p^2}{4D} \\ -\sigma^2(g\bar{\rho}_{12}) \\ -\frac{\lambda_p^2}{4D} - \frac{\lambda_p^2(\bar{Z}-D)}{2D^2} \end{bmatrix}$$

Thus, $$H_2 = P_2(-)\begin{pmatrix}1\\0\\0\end{pmatrix}\left[\sigma^2(g\bar{\rho}_{12})^2 + \frac{(\bar{Z}-D)^2\lambda_p^2}{2D^2} + \frac{9}{16}\lambda_p^2 + \right. \quad (A.30)$$

$$\left. \frac{\sigma^2\lambda_p^2}{2D^2} + \frac{(\bar{Z}-D)\lambda_p^2}{4D} + \lambda_p^2 \right]^{-1}$$

$$\simeq \begin{pmatrix} 1 \\ -\frac{1}{g\bar{\rho}_{12}} \\ 0 \end{pmatrix}.$$

The approximation of Eq. (A.30) follows from the fact that $\sigma^2(g\bar{\rho}_{12})^2$ dominates all other denominator terms for $\lambda_p$ of 0.01 or smaller. Using this approximation $X_2^+$ becomes $$X_2^+ = \begin{bmatrix} P_1^+ - (g\rho_{12})^-(Z-D) \\ Z-D \\ (g\rho_{12})^- \end{bmatrix} + \quad (A.31)$$

$$\begin{pmatrix} 1 \\ -\frac{1}{g\bar{\rho}_{12}} \\ 0 \end{pmatrix} [M_{22} - P_1^+ + (g\rho_{12})^-(Z-D)].$$

Note that in Eq. (A.31) the value $g\rho_{12}$ is required, but this quantity is, of course, unknown. Consequently, the value $(g\rho_{12})^-$ must instead be used which results in $$X_2^+ \simeq \begin{bmatrix} P_1^+ (g\rho_{12})^- Z \\ Z-D \\ (g\rho_{12})^- \end{bmatrix} + \begin{bmatrix} M_{22} - P_1^+ + (g\rho_{12})^-(Z-D) \\ -\frac{(M_{22} - P_1^+)}{(g\rho_{12})^-} - (Z-D) \\ 0 \end{bmatrix} \quad (A.32)$$

so that $$\hat{Z}_3 = \frac{P_1^+ - M_{22}}{(g\rho_{12})^-} + D \quad (A.33)$$

Using $P_1^+$ of Eq. (A.18) and $(g\rho_{12})^-$ of Eq. (A.26) along with Eq. (A.33) results in $$\hat{Z}_3 = \frac{3M_{12} + M_{02} - D(g\rho_{01})^- - 4M_{22}}{4(g\rho_{12})^-} + D \quad (A.34)$$

$$= D + \frac{(3M_{12} + M_{02} - 4M_{22} - M_{01} + M_{11})D}{M_{01} + M_{02} - M_{11} - M_{12} + M_{21} + M_{22} - M_{31} - M_{32}}$$

which is Eq. (20).

We claim:

1. A method for conducting a gravimetry survey of subsurface formations surrounding a borehole comprising the steps of:

(a) traversing a borehole with a borehole gravity meter, (b) simultaneously traversing the borehole with a pair of pressure transducers located at spaced apart positions along the axis of said borehole and in fixed axial relationship with said borehole gravity meter, (c) periodically stopping the traverse of said borehole gravity meter and said pair of pressure transducers to take borehole gravity and borehole fluid pressure measurements at a plurality of measurement locations within the borehole, (d) utilizing the pair of pressure measurements at a first of said measurement locations and the pair of pressure measurements at a second of said measurement locations to determine the distance along the borehole between said first and second measurement locations.

2. The method of claim 1 wherein the step of utilizing the pair of pressure measurements taken at each measurement location to determine the distance along the borehole between measurement locations is carried out in accordance with the following expression:

$$\Delta Z = \frac{(P_1 - P_2)(2D)}{P_0 - P_1 + P_2 - P_3} + D$$

where, $\Delta Z$ = distance between measurement locations,

D = distance between the pair of pressure transducers, $P_0$ and $P_1$ = pressure measurements from the pair of pressure transducers at a first measurement location; and $P_2$ and $P_3$ = pressure measurements from the pair of pressure transducers at a second measurement location.

3. The method of claim 1 further including the step of clamping said pressure transducers to the borehole wall during the taking of said borehole fluid pressure measurements.

4. The method of claim 1 further comprising the steps of carrying out second borehole fluid pressure measurements at each of said measurement locations with said pair of pressure transducers.

5. The method of claim 4 wherein the step of utilizing the pair of pressure measurements taken at each measurement location to determine the distance along the borehole between measurement locations is carried out in accordance with the following expression:

$$\Delta Z = \frac{(M_{12} - M_{22})(2D)}{M_{01} - M_{11} + M_{21} - M_{31}} + D$$

where, $\Delta Z$ = distance between measurement locations,

D = distance between the pair of pressure transducers, and $M_{ij}$ = the jth pressure reading at vertical position i, for example $M_{12}$ is the second pressure measurement at vertical position 1.

6. The method of claim 4 wherein the step of utilizing the pair of pressure measurements taken at each measurement location to determine the distance along the borehole between measurement locations is carried out in accordance with the following expression:

$$\frac{D(3M_{12} + M_{11} - 4M_{22} + M_{02} - M_{01})}{(M_{01} + M_{02} - M_{11} - M_{12} + M_{21} + M_{22} - M_{31} - M_{32})} + D$$

where, $\Delta Z$ = distance between measurement locations,

D = distance between the pair of pressure transducers, and $M_{ij}$ = the jth pressure reading at vertical position i, for example $M_{12}$ is the second pressure measurement at vertical position 1.

7. The method of claim 1 further comprising the step of:

determining the bulk density of the formation surrounding the borehole from the plurality of gravity measurements and the distances traveled by said gravimetric logging tool between the taking of successive gravity measurements.

8. A borehole gravimetry system comprising:

(a) a logging cable, (b) a borehole gravity meter affixed to said cable, (c) a first pressure transducer affixed to said logging cable, (d) a second pressure transducer affixed to said logging cable in spaced relation to said first pressure transducer, and (e) means for moving said logging cable through the borehole and stopping at successive measurement locations within the borehole to permit the taking of gravity and borehole fluid pressure measurements.

9. The system of claim 8 further including means for clamping said first and second pressure transducers to the borehole wall during the taking of said borehole fluid pressure measurements.

* * * * *